US012472126B2

(12) United States Patent
Samandari

(10) Patent No.: US 12,472,126 B2
(45) Date of Patent: Nov. 18, 2025

(54) ORTHOTROPIC AND ORTHOGNATHIC ORAL DEVICE AND METHOD

(71) Applicant: BREATHE BABY PRODUCTS INC., Mountlake Terrace, WA (US)

(72) Inventor: Nafys Samandari, Phoenix, AZ (US)

(73) Assignee: BREATHE BABY PRODUCTS INC., Mountlake Terrace, WA (US)

( * ) Notice: Subject to any disclaimer, the term of this patent is extended or adjusted under 35 U.S.C. 154(b) by 855 days.

(21) Appl. No.: 17/240,308

(22) Filed: Apr. 26, 2021

(65) Prior Publication Data

US 2021/0308017 A1 Oct. 7, 2021

Related U.S. Application Data

(63) Continuation-in-part of application No. 17/138,831, filed on Dec. 30, 2020, now Pat. No. 12,109,174, and a continuation-in-part of application No. PCT/US2020/027279, filed on Apr. 8, 2020, and a continuation-in-part of application No. 16/711,128, filed on Dec. 11, 2019, now abandoned, and a continuation-in-part of application No. 16/383,223, filed on Apr. 12, 2019, now Pat. No. 10,555,876.

(51) Int. Cl.
*A61J 11/00* (2006.01)

(52) U.S. Cl.
CPC ............ *A61J 11/006* (2013.01); *A61J 11/004* (2013.01)

(58) Field of Classification Search
CPC ...... A61J 11/004; A61J 11/008; A61J 11/007; A61J 11/0065; A61J 11/0035; A61J 11/006; A61J 11/045; A61J 11/04; A61J 11/005; A61J 11/00; A61J 9/00; A61J 9/04; A61J 9/02; A61J 9/006; A61J 9/005; A61J 9/003; A61J 9/001
See application file for complete search history.

(56) References Cited

U.S. PATENT DOCUMENTS

| | | | |
|---|---|---|---|
| 2,520,773 | A | 8/1950 | Muller |
| 2,588,069 | A | 3/1952 | Allen |
| 2,876,773 | A | 3/1959 | Witz |
| 3,113,569 | A | 12/1963 | Barr |
| 3,130,725 | A | 4/1964 | Griesinger |
| 3,610,248 | A | 10/1971 | Davidson |
| 3,924,621 | A | 12/1975 | Cassimally |

(Continued)

FOREIGN PATENT DOCUMENTS

| | | |
|---|---|---|
| DE | 102004031106 | 1/2006 |
| GB | 2480453 | 11/2011 |

(Continued)

*Primary Examiner* — Dianne Dornbusch
(74) *Attorney, Agent, or Firm* — Knobbe, Martens, Olson & Bear, LLP

(57) ABSTRACT

A hygienic oral feed-bottle nipple includes an opening skirt to expand and rotate in the buccal vestibule. As the child completes the suckling cycle, the mouth portion is distorted, the skirt extended to provide cleaning, stimulation, and a bumper to deny extensive pronation. The flanges and skirt may be covered with a textured surface, or bristles, that provide mechanical brushing of oral surfaces. Hard pads set along a superior surface of the nipple are compressed against the maxilla palate and provide upwards and/or lateral force to encourage lateral expansion of the palate. The nipple may be bifurcated into left and right opposing lobes which can split laterally to enhance lateral force on maxilla.

21 Claims, 15 Drawing Sheets

(56) References Cited

U.S. PATENT DOCUMENTS

| | | | |
|---|---|---|---|
| 4,115,893 | A | 9/1978 | Nakata et al. |
| 4,505,398 | A | 3/1985 | Kesselring |
| 5,133,740 | A | 7/1992 | Kussick |
| 5,190,174 | A | 3/1993 | Klag |
| 5,342,398 | A | 8/1994 | Sun |
| 5,474,028 | A | 12/1995 | Larson |
| 5,553,726 | A | 9/1996 | Park |
| 5,711,759 | A | 1/1998 | Smith et al. |
| 5,922,010 | A | 7/1999 | Alanen et al. |
| 6,241,110 | B1 | 6/2001 | Hakim |
| 6,602,013 | B2 | 8/2003 | Clark |
| 6,769,828 | B2 | 8/2004 | Clark |
| 7,144,416 | B2 | 12/2006 | Struckmeier et al. |
| 8,211,144 | B2 | 7/2012 | Rohrig |
| 10,555,876 | B1 | 2/2020 | Samandari |
| 2001/0029324 | A1 | 10/2001 | Walker et al. |
| 2002/0063103 | A1 | 5/2002 | Kiernan |
| 2003/0034031 | A1 | 2/2003 | Lev |
| 2003/0163162 | A1 | 8/2003 | Uehara et al. |
| 2004/0220618 | A1 | 11/2004 | Rohrig |
| 2007/0131637 | A1 | 6/2007 | Tamura |
| 2007/0208380 | A1 | 9/2007 | Ebner |
| 2007/0221604 | A1 | 9/2007 | Hakim |
| 2007/0238063 | A1 | 10/2007 | Tesini et al. |
| 2007/0272645 | A1 | 11/2007 | Ito |
| 2008/0033489 | A1 | 2/2008 | Tesini et al. |
| 2008/0210655 | A1 | 9/2008 | Rees et al. |
| 2009/0139950 | A1 | 6/2009 | Greter et al. |
| 2009/0248074 | A1 | 10/2009 | Kliegman et al. |
| 2010/0140204 | A1 | 6/2010 | Vischer |
| 2011/0046671 | A1 | 2/2011 | Okoturo |
| 2011/0100944 | A1 | 5/2011 | Van Der Kooi et al. |
| 2011/0184460 | A1 | 7/2011 | Hakim |
| 2012/0053632 | A1 | 3/2012 | Tirosh |
| 2012/0078143 | A1 | 3/2012 | Hernandez et al. |
| 2013/0263864 | A1 | 10/2013 | von Treuenfels |
| 2013/0304121 | A1 | 11/2013 | Hakim |
| 2014/0046370 | A1 | 2/2014 | Fave-Lesage |
| 2015/0142054 | A1 | 5/2015 | Itzek |
| 2015/0164749 | A1 | 6/2015 | Lacroix |
| 2016/0081884 | A1 | 3/2016 | Palmer |
| 2017/0000694 | A1 | 1/2017 | Lee |
| 2017/0151131 | A1 | 6/2017 | Bawa |
| 2018/0311112 | A1 | 11/2018 | Moor |

FOREIGN PATENT DOCUMENTS

| | | |
|---|---|---|
| JP | H0956787 | 3/1997 |
| KR | 20140141944 | 12/2014 |
| WO | WO2011092706 A1 | 8/2011 |

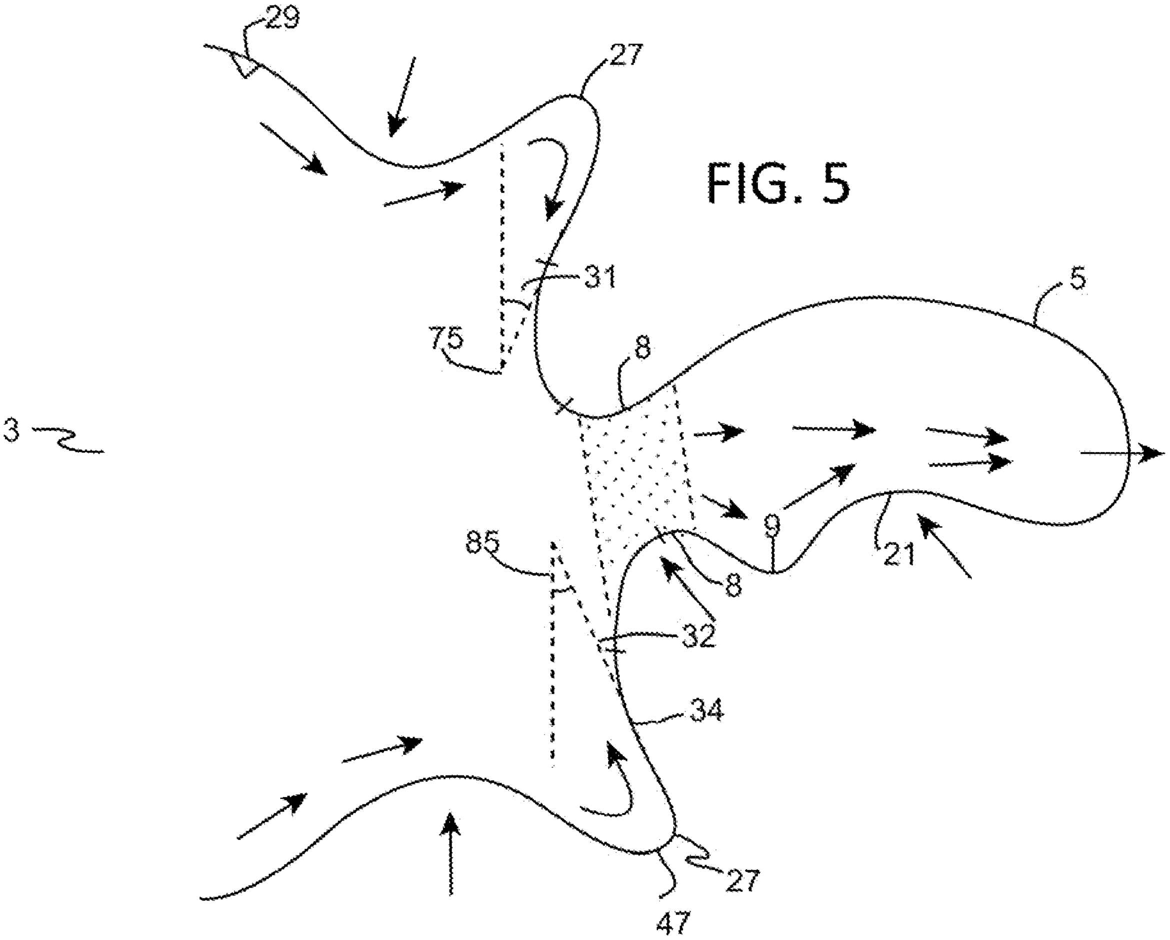
FIG. 5
FIG. 6
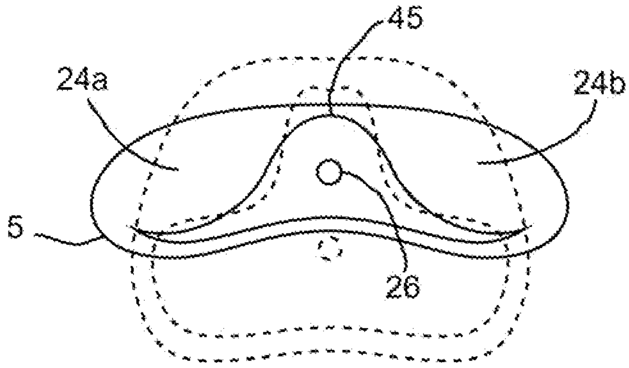

ORTHOTROPIC AND ORTHOGNATHIC ORAL DEVICE AND METHOD

CLAIMS OF PRIORITY

The present application is a continuation-in-part of U.S. patent application Ser. No. 17/138,831, filed Dec. 30, 2020, now U.S. Pat. No. 12,109,174, issued Oct. 8, 2024, which is a continuation-in-part of U.S. patent application Ser. No. 16/711,128, filed Dec. 11, 2019, now abandoned, which is a continuation of U.S. application Ser. No. 16/383,223, filed Apr. 12, 2019, now U.S. Pat. No. 10,555,876, issued Feb. 11, 2020. U.S. patent application Ser. No. 17/138,831, is also a continuation-in-part of PCT application Serial No. PCT/US20/27279, filed Apr. 8, 2020, which claims priority to U.S. provisional patent application Ser. No. 62/872,900, filed Jul. 11, 2019, U.S. patent application Ser. No. 16/711,128, now abandoned, and U.S. application Ser. No. 16/383,223, filed Apr. 12, 2019, now U.S. Pat. No. 10,555,876, issued Feb. 11, 2020. Each of the above-referenced applications is hereby incorporated by reference in its entirety.

BACKGROUND OF THE INVENTION

1. Field of the Invention

The present invention relates to the general art of oral care. The present invention more particularly relates to pediatric oral orthotropic development feeding devices and uses thereof.

2. Description of Related Prior Art

A bottle nipple used for feeding, or other devices intended for use in a mouth, will be introduced, at least partially, into the oral cavity. Bottles may be equipped with flexible nipples to simulate the natural skin of a mother's breast nipple, and include one or more holes, channels, and/or pores to allow expression of fluid (e.g., formula, milk, etc.) to the exterior of the nipple surface. Children from the age of zero to two years+ commonly use oral apparati, such as pacifiers, bottle nipples, teethers, etc. for numerous purposes. In addition to feeding, these tools may be used to exercise a child's tongue and cheek muscles, promote development of the maxilla, and otherwise serve to clean interior surfaces of the oral cavity via friction provided by the pacifier exterior surface(s).

Limited inventions have been directed to orthotropics and improvement of the development of the upper palate and/or mandible in the developing mouth. Nine out often children in the developed world may suffer some level of sleep-disordered breathing (SDB) and/or obstructive sleep apnea (OSA), including symptoms from sleep disorders, to breathing issues, to growth retardation.

While newborns are often born without any erupted teeth, up to 15% of newborns in the United States have one or more teeth present at birth. The "baby" tooth or teeth may be compromised due to decay caused by bacterial metabolic byproducts such as acids produced from substances in the oral cavity such as sugars present in milk, formula, or otherwise the tooth/teeth may be susceptible to damage from bacterial and fungal biofilms that may develop on the oral surfaces. It is therefore advantageous to include an oral apparatus that acts to clean, or otherwise brush, the upper and lower gingival ridges and/or erupted teeth.

Most oral apparati, such as pacifiers, binkies, soothies, etc., are often 360-degree symmetrical to mimic the natural human nipple. Oftentimes, a binky, or surrogate nipple, may be uniformly isometric, such as including a cylindrical nub with hemispherical cap (imitating a mother's biological nipple). Advanced oral devices may be transversely symmetrical, left to right, however, may include longitudinal shape changes such as alternating superior and inferior sides to better mimic the shape and location of the tongue, and the slight overbite of a baby, newborn, infant, or toddler. The promotion of an ideal orthognathic relation of the maxillary and mandibular arches, preferably at least partially via orthotropic muscular development and pressures, leads to the better development of the airway spaces, and this contributes to the prevention of multiple chronic maladies. As known in the field of orthotropics, deficiencies in airway spaces exacerbate these chronic conditions.

It is therefore a primary object of the present invention to provide an oral device that provides for friction activated cleansing and/or stimulation of interior oral surfaces.

It is another object of the present invention to provide a pacifier to mate with at least one of the superior or inferior ridges (gingival and/or tooth).

It is yet another object of the present invention to foster proper development of the orthognathic relationship of the upper and lower jaw bones.

It is as yet a further object of the present invention to foster proper development of the upper palate and related bone structures.

It is a further object of the present invention to provide an easy-to-use oral device useful for babies and/or small children.

These and other objects of the present invention will become apparent to those skilled in the art as the description thereof proceeds.

SUMMARY OF THE INVENTION

The present inventions directed to a bottle-feed nipple device adapted to be at least partially inserted into the oral cavity and form a resting shape when at rest and a compressed form when under pressure from either compression of a nipple, collar, and/or neck of the device. The device includes a nipple bulb set on a posterior end of the device, a collar joining with a skirt and a neck along an anterior end of the device. Preferably the neck and/or interior end are couple to a feed bottle. The nipple bulb has one or more pore(s) along a posterior outer surface of the bulb. The bulb also includes a pair of laterally opposing pads set along a superior surface of the bulb, with a central cleft set between the pair of laterally opposing pads. The bottom of the bulb may include a tongue guide as a depression along an inferior surface of the nipple bulb. The tongue guide may be defined by one or more or a continuous encircling ridge. Preferably, an inferior lingual ridge defines a posterior edge of the tongue guide.

The device may also include a superior skirt coupled anterior of the nipple bulb, the superior skirt having a bumper edge along the tip(s) of the skin. The device may also include an inferior skirt coupled anterior of the nipple bulb.

The device may have resting shape and a compressed shape. The resting shape includes the superior and inferior skirts at a first narrow angle relative a center line set horizontal and longitudinally through the device, with the pair of laterally opposing pads in a first position. The device forming a compressed state external pressures are applied against the nipple bulb (by the tongue and/or roof of mouth), at a collar via one or more alveolar ridges and/or at the neck by one or more pursing lips. The superior and inferior skirts are rotated to a greater angle and the pads are forced laterally apart in the compressed state.

The present invention is also directed to an oral device adapted to be partially inserted into the oral cavity. The present invention may take the form of a bottle nipple, or otherwise. When functioning as a bottle feed nipple, a single molded piece is preferred to fit over an open end of a bottle.

The upper portion of the intra oral device may include a solid and/or flexible padding with one or more materials. Harder or thicker, those of a higher durometer, portions of the dome (or pads) may be separable, or at least change their relative orientation, as a central material stretches. As the sucking motion is conducted, a tongue pressure pushes up on the bottom of the nipple (preferably at the tongue guide depression) and causes lateral stretching of the device. As the device is stretched, the harder/thicker portions at the top side resist stretching and are thus thrust against the upper palate and cause a slight upward and laterally outward force. The lower portion includes a tongue depression, preferably a concentric circular or toroidal extension guide, to better ensure proper alignment of device with the center of mouth and tongue. The outer surface of the device may include bristles, or a spiral shape for cleaning purposes, often as rubbed against surfaces of the mouth.

A nipple version of the present invention may include various undulations, and/or ribs, to cause proper turbulence of flowing fluids, to provide stimulation/cleaning to the oral surfaces, and to prevent vacuum seals on the mouth surfaces, and avoid hematomas. Turbulence may induce micro vibrations that stimulate growth plates and suture plates in the tissues and bones along and within oral surfaces. The angle of the pronation of the teeth and/or alveolar ridges is controlled and prevented from exceeding certain thresholds. e.g. 20° pronation that can cause adverse deformation of the malleable (growing) jaws. Further, the superior and inferior edges of the device, preferably at the collar, are offset with the superior set slightly (e.g. 1-3 mm) forward relative the inferior collar to promote proper orthotropic and/or orthognathic alignment of the maxilla and mandible relative the skull.

A shell of the nipple may include an outer surface that has surface features, such as a texture, fingers, bristles, etc. The textured surface may be set in direct contact with the alveolar ridges (either bare gums (edentulous), or with erupted teeth). In alternative embodiments, the textured surface may also extend along the inferior surface of the nipple and bulb to provide for cleaning of the top of the tongue, and along superior surface to clean the roof of the mouth/hard palate.

BRIEF DESCRIPTION OF THE DRAWINGS

The present invention will be described with greater specificity and clarity with reference to the following drawings, in which:

FIG. 5 illustrates a side cross-sectional view of the mouth portion in compressed state of an embodiment of the present invention.

FIG. 6 illustrates a frontal view of a nipple in compressed state of an embodiment of the present invention.

DETAILED DESCRIPTION OF THE PREFERRED EMBODIMENTS

With use of embodiments of the present invention, one may provide hygienic and/or orthotropic support to new-borns, infants, children, adolescents (or even adults). The present invention maybe used to prevent adverse deformation of the tissues and bones associated with the mouth. When used in newborns and infants, the application of orthotropic devices can guide the eruption of teeth and position and orient the bones in an ideal position. Further, via application of rhythmic vibrational signaling, stem cells can be activated, and causing phenotype improvements via epigenetic expression guided via external stimulation of the genotype. Rhythmic vibrational signaling can increase or induce stem cell development in the area of the signal.

Proper orthotropic development may also have multiple other pathways for providing a healthier human, both aesthetically and for health factors. Obstructive sleep apnea affects millions of people of all ages. In children, symptoms can range from bed wetting, choking, drooling, coughing, night sweats, behavioral problem, learning disabilities, sluggishness, snoring, teeth grinding, restlessness, attention deficit hyperactivity disorder (ADD or ADHD).

By forming an orthotropically aligned mouth, with proper basal pharyngeal anatomy, a root cause of sleep-disordered breathing and obstructive sleep apnea (OSA) can be minimized, controlled, or even eliminated. With the present invention and embodiments thereof, we may control or prevent these chronic and debilitating diseases.

Figure 13:
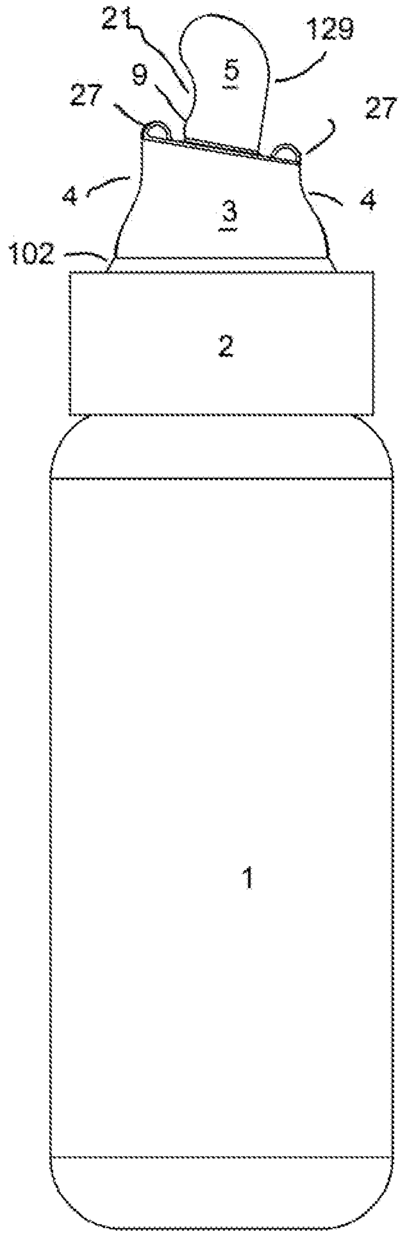
FIG. 13 illustrates a side view of an embodiment of the present invention.
Figure 14:
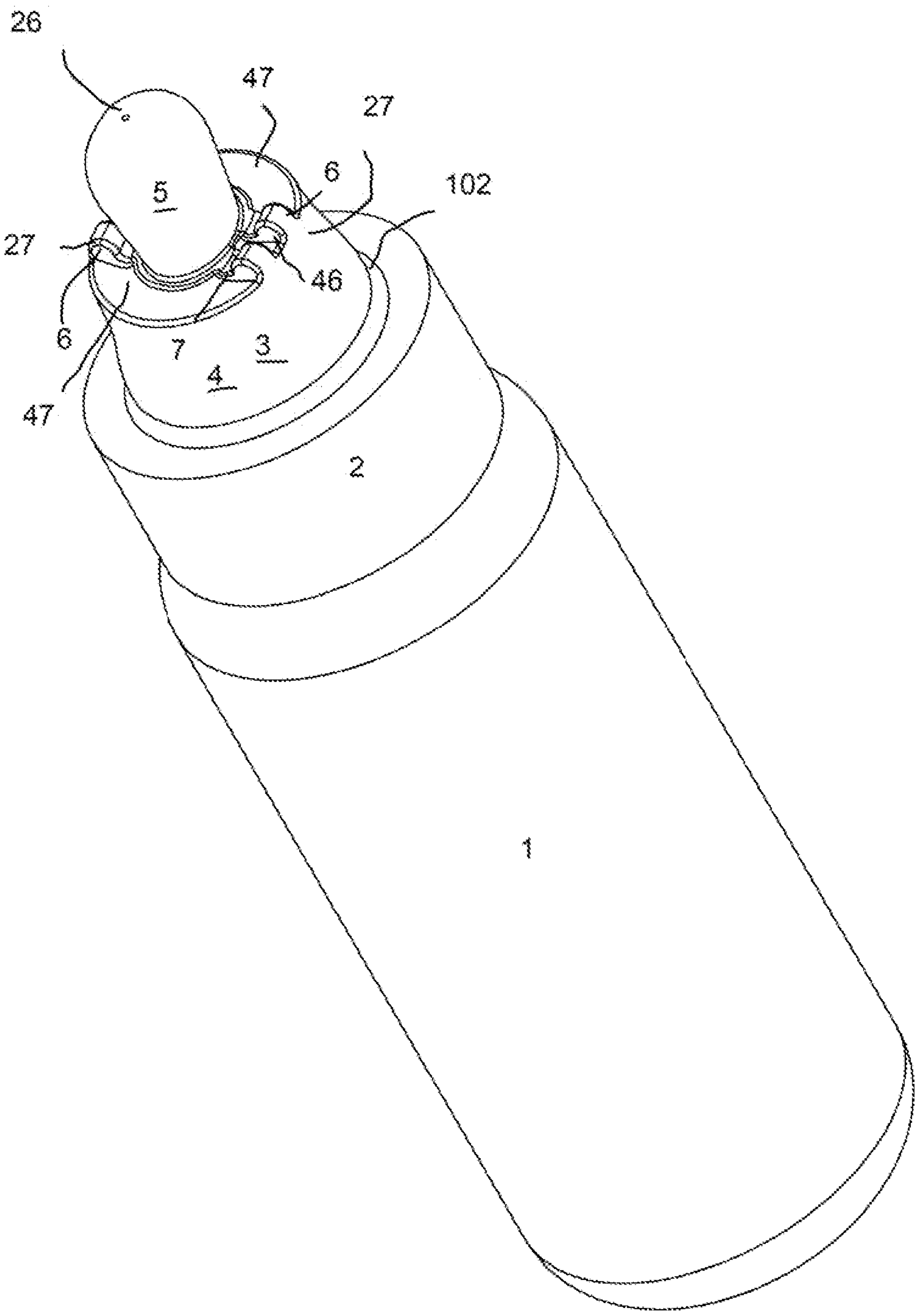
FIG. 14 illustrates a perspective view of an embodiment of the present invention.
Figure 15:
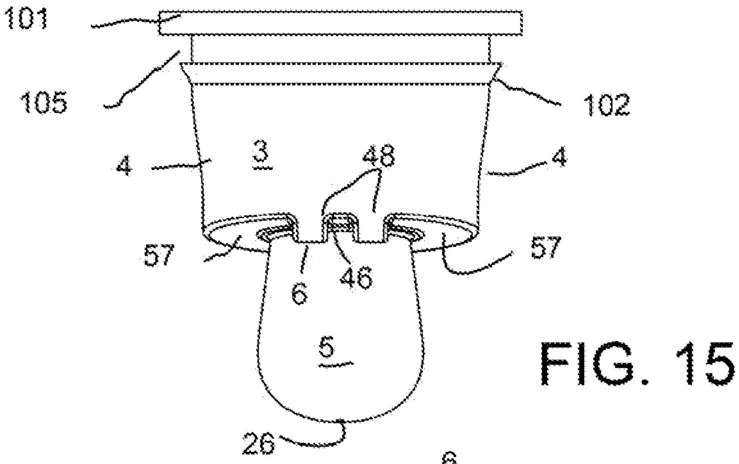
FIG. 15 illustrates a top view of a mouth portion of an embodiment of the present invention.
Figure 16:
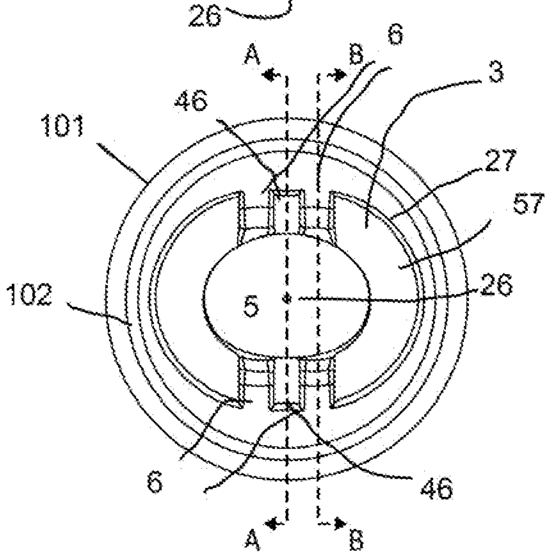
FIG. 16 illustrates a frontal view of a mouth portion of an embodiment of the present invention.
Figure 17:
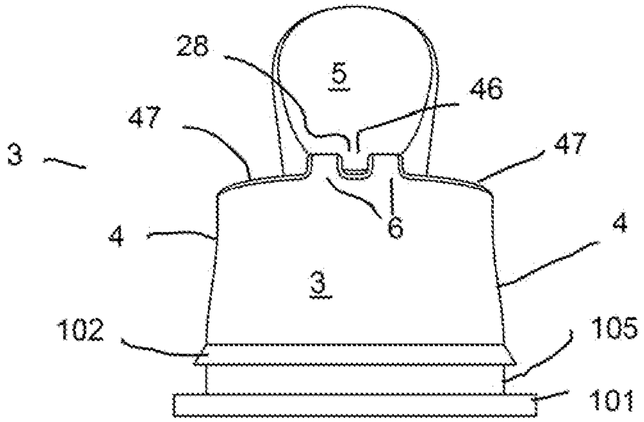
FIG. 17 illustrates a bottom view of a mouth portion of an embodiment of the present invention.
Figure 18:
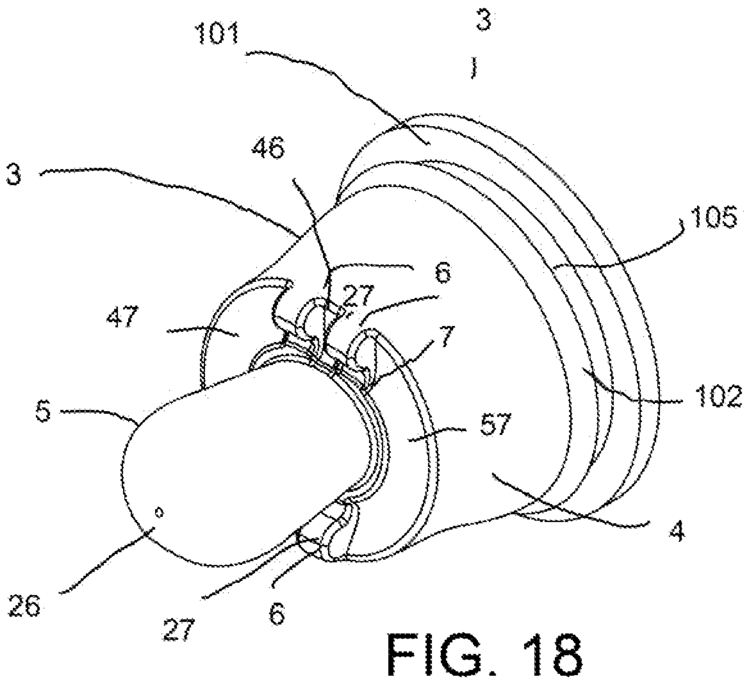
FIG. 18 illustrates a perspective view of a mouth portion of an embodiment of the present invention.
Figure 19:
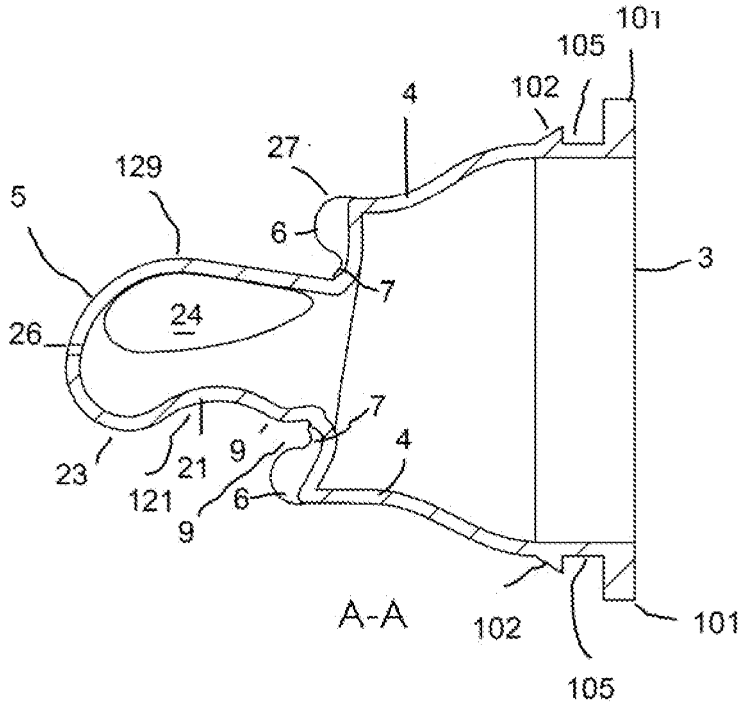
FIG. 19 illustrates a side cross-section view along lines A-A of FIG. 16.
Figure 28:
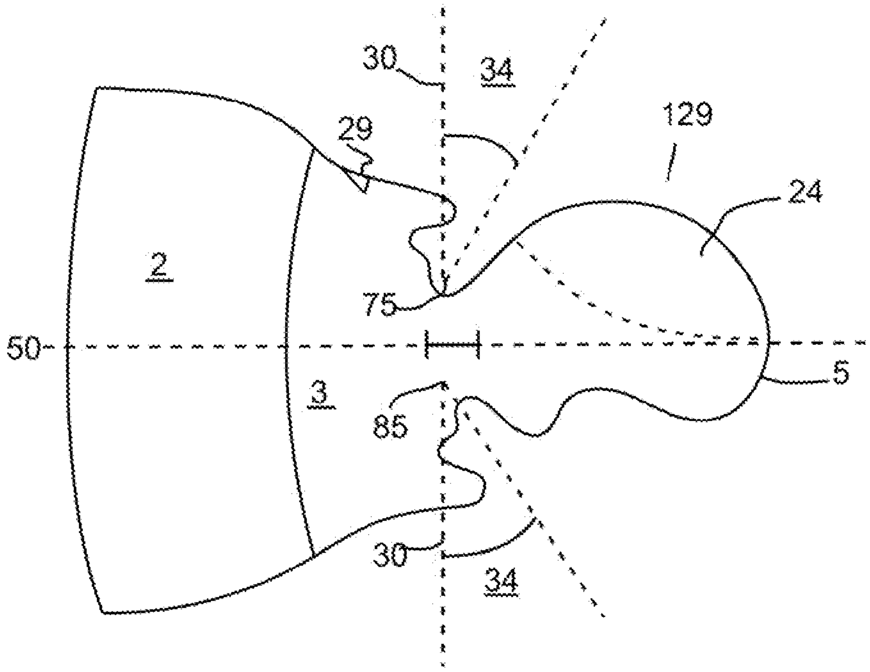
FIG. 28 illustrates a side cross-sectional view of an embodiment in passive state.

An embodiment with discreet ribs can be seen in FIGS. 13-15, where bottle 1 may be equipped with cap 2. Bottle 1 is shown with cap 2 at posterior end of the bottle. Mouth portion 3 is set on posterior of cap, and includes skirt 27 and nipple bulb 5. Cap 2 may be threadedly engaged to screw onto bottle 1. Mouth portion 3, fits onto cap 2, preferably via a channel lip fastening connection as shown below in FIGS. 15-22. It is preferable that cap may be removed from bottle via unscrewing, and nipple may be removed from cap, to facilitate cleaning of the bottle and components. Cap is preferably made of a hard plastic, while nipple is preferably made of a softer plastic, silicon, rubber, silicone, or other known material for nipples, bottles, and pacifiers. Nipple bulb 5 may include air vent 29, preferably set outside area of lips when in use (as shown in FIG. 28). Air vent 29 is preferably set on top of the nipple surface, or along superior surface 129.

Figure 20:
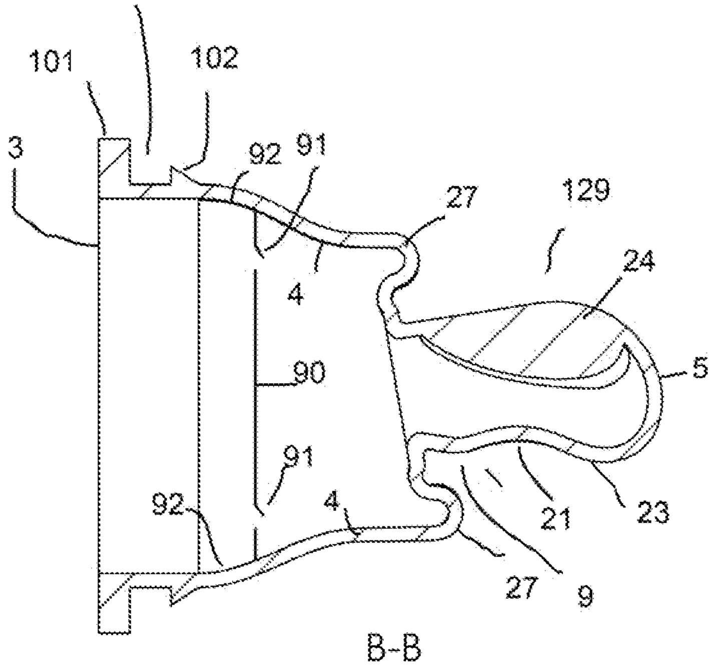
FIG. 20 illustrates a side cross-section view along lines B-B of FIG. 16.

As shown in FIG. 20, a one-way valve 90 is preferably set on mouth portion 3 to prevent backflow of fluids posterior of the valve to flow back into the bottle. Valve 90 further increases the pressure on the posterior end (nipple end) to assist in expression of fluids through pore(s), and to increase pressure on skirt 27 to cause full expression of skirt and enhance rhythmic vibration as fluid turbulently moves within mouth portion Skirt and nipple bulb 5, especially along interior of skirt(s) major and/or minor undulations and bumper edge.

Figure 1:
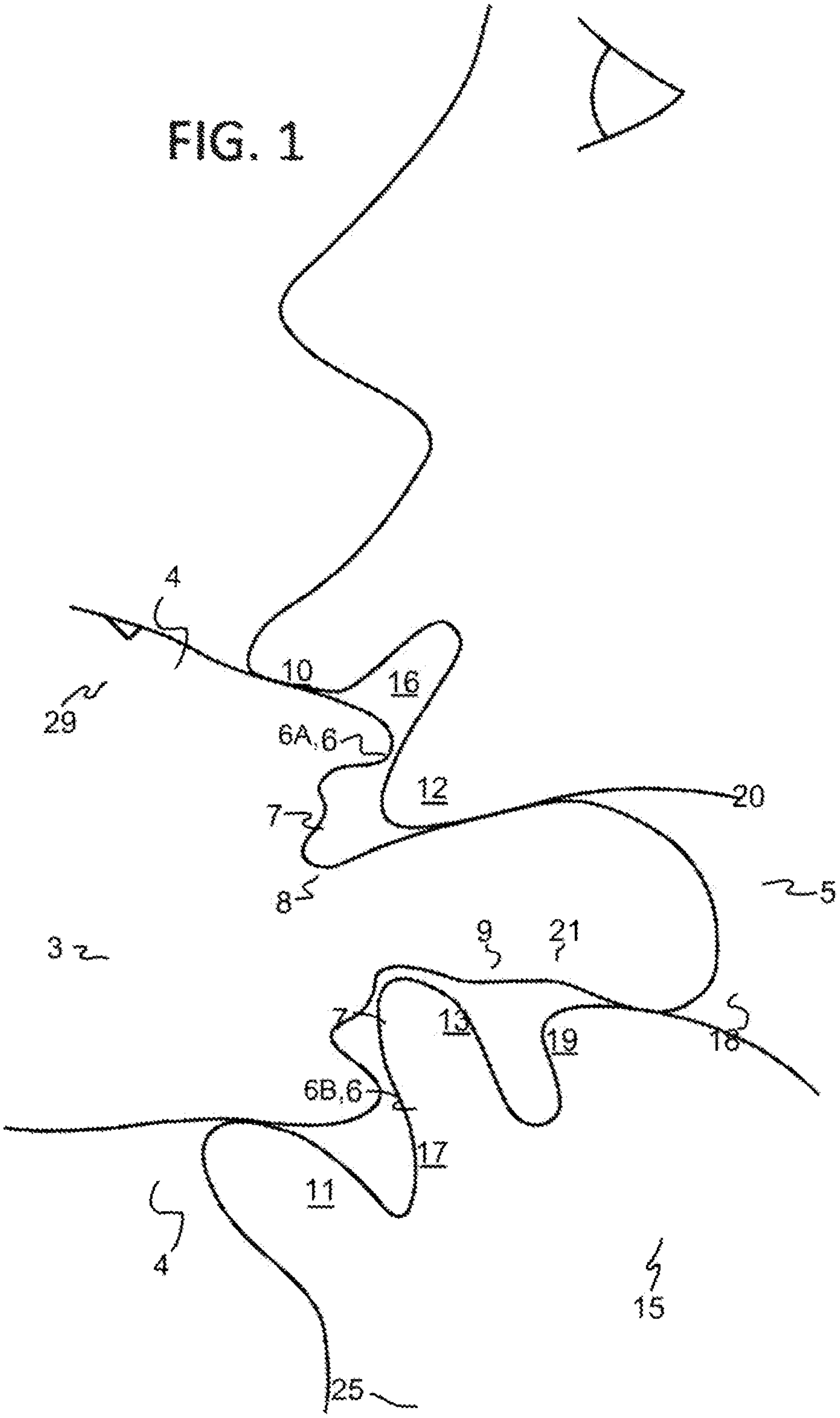
FIG. 1 illustrates a side cross-sectional view of an embodiment in passive state as applied into a human mouth.
Figure 2:
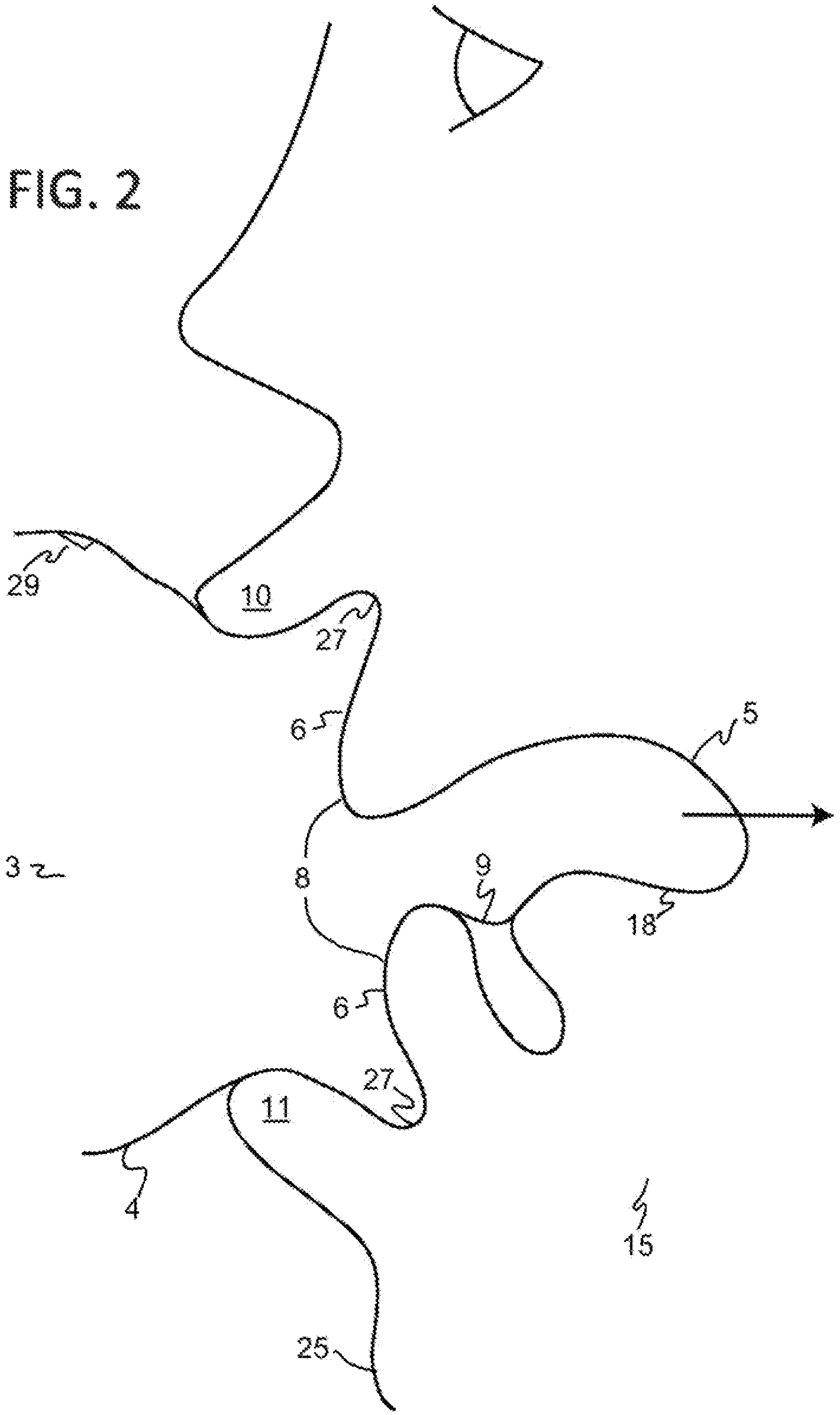
FIG. 2 illustrates a side cross-sectional view of an embodiment in a compressed state as applied into a human mouth.

With reference to bottle mouth portion 3 in use with a human mouth, FIGS. 1-2 demonstrate two states of action. FIG. 1 demonstrates the mouth portion 3, including skirt 27 and nipple bulb 5 applied to a human mouth prior to application of compressive forces. This is termed the passive state, as equilibrium forces within and outside the mouth portion, the structure, shape, and orientation remain in passive form. Upper lip 10 and lower lip 11 of the user may fit onto neck 4 of mouth portion, with neck acting as a lip hold. Superior and inferior alveolar ridges 12 and 13 bite down on collar 8. Major undulations 6 may be provided opposite bottle posterior neck 4. Major undulations, including both superior major undulation and inferior major undulation 6A and 68, are preferably set to fit into the maxillary buccal vestibule 16 and mandibular buccal vestibule 17, respectively, when in compressed form (as shown in FIG. 2). Minor undulations 7, fit along/between major undulations (as shown) and are set anterior the bulb of main nipple at collar 8. Together, the major and minor undulations form ribs (radially emanating and/or vertical structure of ribs described below). Tongue 19 presses upwards on guide 21, to squeeze bulb 5 and force bulb 5 to deform and extend into oral cavity 18.

When sucking, ribs and minor undulations encourage turbulence of fluid flowing within mouth part, and further prevent vacuum seal against oral surfaces. Ribs further allow expansion of the flanges of the skirt to expand outwardly from center line 50 (shown in FIGS. 28, 28A, and 281B, below) to fill in portions of the vestibules. Lips wrap around neck, potentially forming a fluid tight seal. Lips purse to cause skirt deformation. Lips press neck via the user's orbicularis oris muscle squeeze the neck forcing skirt to extend and/or rotate outward to fill the vestibules (superior and inferior). Sucking force propels nipple bulb 5 posterior into throat extending the bulb and deforming it on the longitudinal direction, and often flattening the bulb via upward/anterior tongue pressure. When suction action is release, material retractive forces from shape memory in the nipple system allow the bulb to reform and retract, the skirt to close and return and the system to reshape as in resting form.

Ribs, allow for mechanical cleaning of gums and alveolar ridges, particularly as the nipple is mechanically moved within the oral cavity. Micro-movements of the undulations may cause a rhythmic vibration, and vibrational signaling, on the oral surfaces to stimulate vascular development, tooth growth, and stem cell growth in the bony membrane and bone development/production. Undulations (major and minor) may form a skirt 27, while major undulations help define a skirt edge 47, that provides for a bumper. As skirt 27 expands in compressed form, skirt edge 47 forms a preferred angle 34 of ten to twenty degrees from center line 50 to prevent excess pronation of the alveolar ridges to go beyond twenty-degrees from vertical axis 30 (or seventy degrees from horizontal plane 50). By capturing the alveolar ridges between the skirt and nipple bulb 5 surface (as shown prominently in FIG. 2), the pronation of the alveolar ridges can be guided by the geometry of the nipple in expanded form (in accord with compressed state of nipple, the terms "expanded" form and "compressed" used interchangeably to refer to the stat of nipple when bulb compressed by tongue during normal use).

Figure 28A:
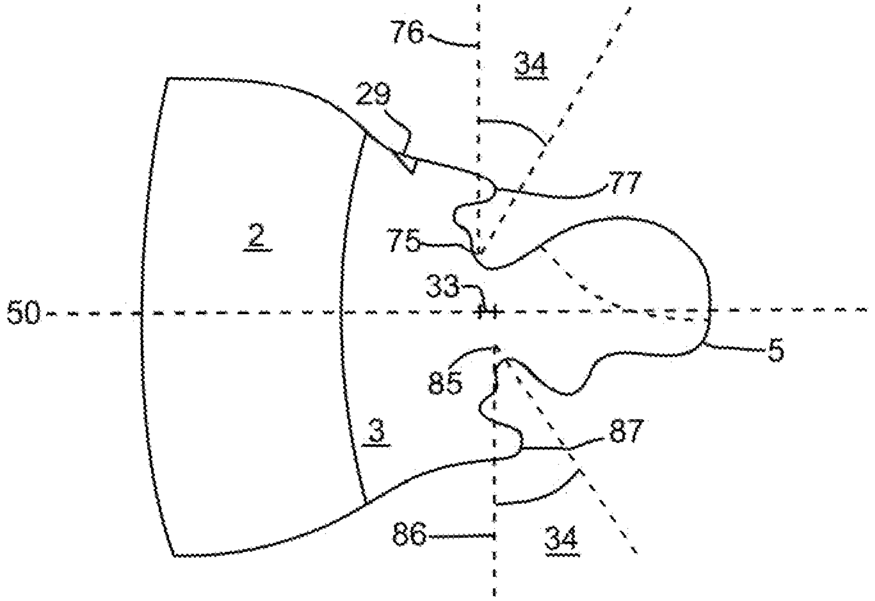
FIG. 28A illustrates a side cross-sectional view of an embodiment in passive state.
Figure 28B:
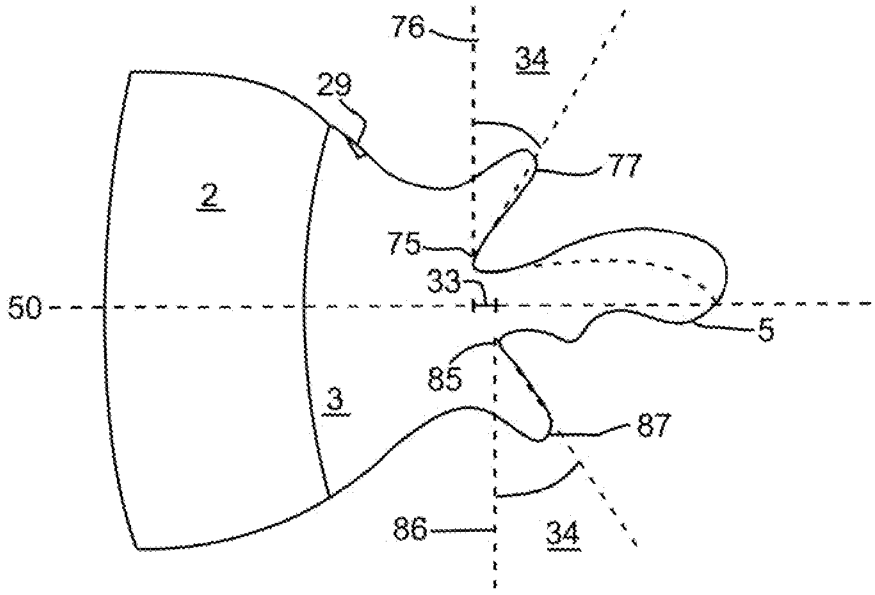
FIG. 28B illustrates a side cross-sectional view of an embodiment in compressed state.

As shown in FIGS. 28, 28A and 28B, vertical axis 30 and horizontal plane 50 meet at vertices 75 and 85, while skirt 27 is intended to roughly rotate along vertex from a more acute angle, as shown in FIG. 28A, to the wider acute angle 34, as shown in FIG. 28B, when exposed to compressive forces to achieve the compressed state (discussed below with reference to FIG. 2). As mandible 15 rises with chin 25 to close mouth, alveolar ridges engage collar to "bite-down" on nipple collar. Nipple bulb 5 may include milk pore 26 at the proximal (or posterior) end of nipple. Milk pore can be one or more apertures in the nipple, dependent on the needed flow rate for feeding in relation to the age/size of infant/user.

Superior vertex 75 is set anterior of inferior vertex 85 by displacement offset 33 for proper orthognathic alignment of the jaws.

Figure 3:
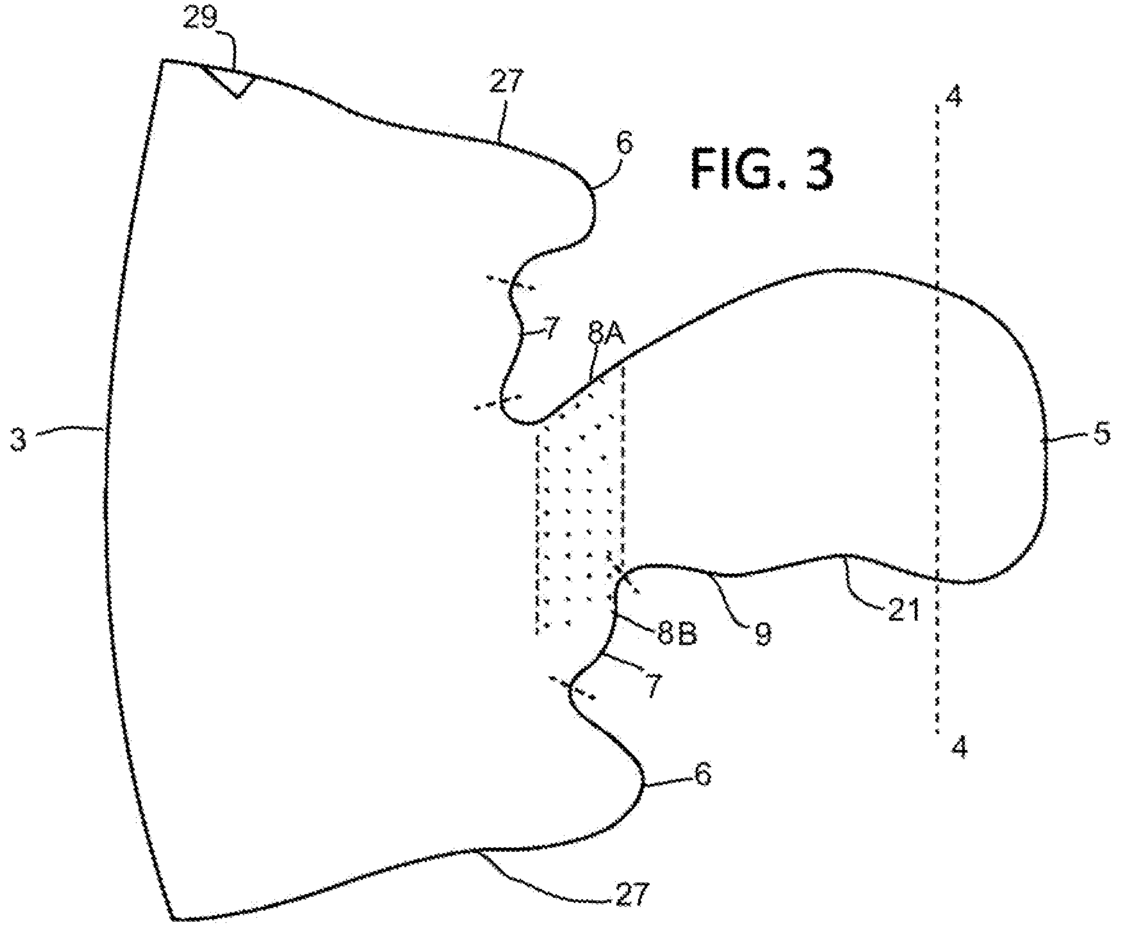
FIG. 3 illustrates a side cross-sectional view of the mouth portion in passive state of an embodiment of the present invention.
Figure 29:
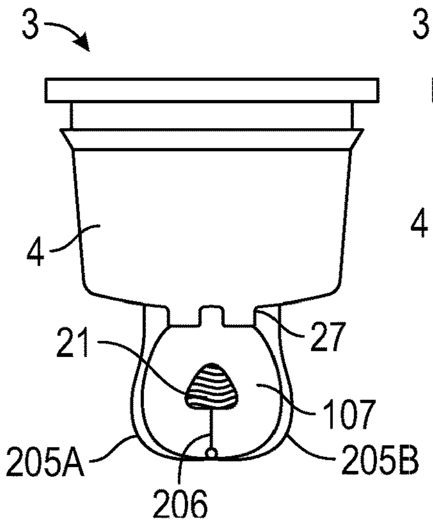
FIG. 29 illustrates an underside of an embodiment of the present invention.

As understood in reference to earlier FIGS. 1-3, between undulations and nipple, a collar 8 is formed. Collar 8 provides placement for maxillary alveolar ridge and mandibular alveolar ridge, respectively. Maxillary alveolar ridge 12 fits onto superior nipple collar, while mandibular alveolar ridge 13 fits into inferior nipple collar. An inferior lingual ridge 9 may be set as between collar 8 and a depressed tongue guide 21. Tongue guide is preferably formed as an inferior extending toroidal portion, or donut, either concentric or oval or other contained shape, forming a lingual donut with extending portion 122 isolating an interior maximal point 121 to guide the tongue tip or superior surface of the tongue into guide 21 (as shown in FIG. 29). Tongue guide 21 provides for a depression to help locate tongue 19. Tongue guide also causes tongue to provide upward force against maxilla, and otherwise exercise and develop habits to strengthen and encourage proper tongue placement when not feeding/using device, and trains the tongue positioning from an early age. Nipple bulb 5 superior surface 129 fits into vault 20 of user's mouth 5.

Figure 25:
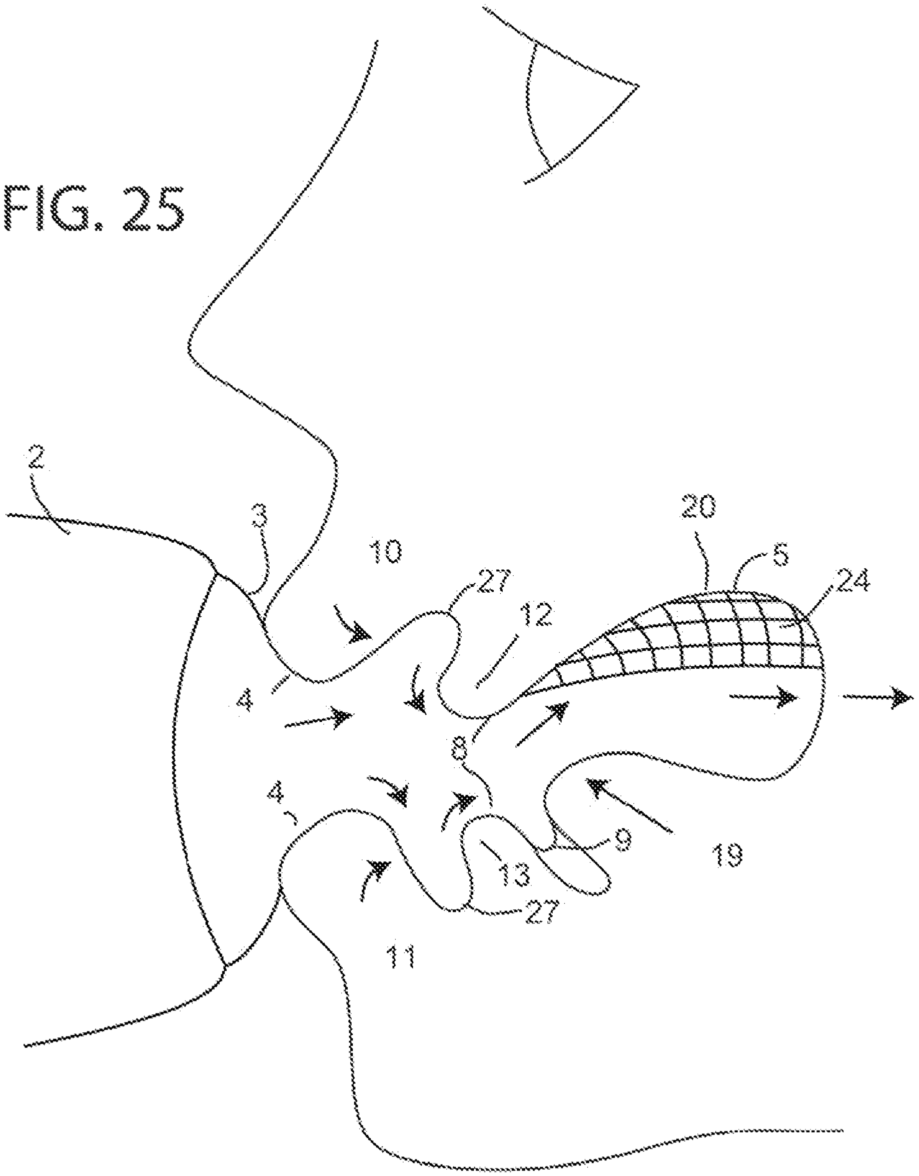
FIG. 25 illustrates a side cross-sectional view of an embodiment in compressed state with force vectors of flow and external pressures.

As seen in FIGS. 2 and 25, the sucking action caused deformation of mouth portion 3 into a compressed state. Force vectors are shown via arrows. Lips 10 and 11 press, to provide push vector compressive forces against superior and inferior neck 4, respectively (neck 4 providing a lip hold). Upper and lower skirt, 27, expand, rotate, and move to fill maxillary and mandibular buccal vestibules, 16 and 17. Maxillary alveolar ridge 12 and mandibular alveolar ridge 13 engage collar 8 to bite down onto mouth portion 3. Tongue 19 further presses upwards and anteriorly into tongue depression guide 21 to press on, or squeeze, nipple bulb 5. When feeding, the mouth serves to suck on nipple in a posterior direction (e.g. as when feeding) to pull nipple back into mouth. As mouth portion 3 is deformed, nipple bulb 5 extends posteriorly, and skirt 27 extends outwardly (up and down).

Figure 4:
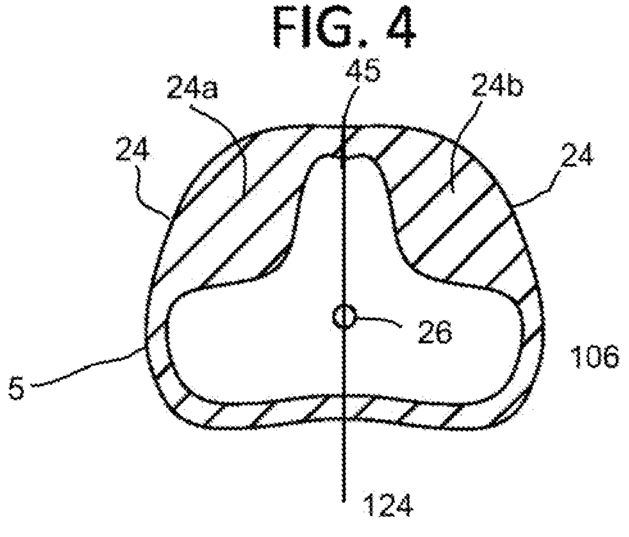
FIG. 4 illustrates a frontal view of a nipple in passive state of an embodiment of the present invention.

As can be seen in FIGS. 3-6, mouth portion 3 in passive (non-compressed) state is shown in FIGS. 3-4, while in compressed state in FIGS. 5-6. Air vent 29 is set along neck 4 in proximity to cap 2 (not shown). Major undulations 6 are shown extending at offset extending lengths to form skirt 27, with minor undulations 7 set between major undulations 6 and collar 8. As is shown in FIGS. 28, superior and inferior collars 8 are offset by linear offset 33 which may be as much as 1-3 millimeters to from an orthotropic collar to guide jaw relationships, to optimize positioning as known in natural breast feeding, and facilitate proper orthotropic and/or orthognathic jaw development. It is contemplated that positioning the superior maxilla, forward by 1-3 millimeters in relation to the inferior mandible, proper alignment of the jaw will be formed. Superior collar 8A may be set 1-3 mm anterior relative inferior collar 813 to enhance orthotropic/orthognathic jaw relationships.

As can be seen, in FIGS. 28, 28A and 28B, vertical axis 30 designates a twenty-degree angular offset 34 from vertical 30, both above and below collars. When viewed relative the horizontal plane 50, extended skirt designates a seventy-degree offset, as the threshold angle to which the pronating alveolar ridge is abutted and stopped from further pronation. It is contemplated that the angle of the alveolar ridges when engaging the collars will limit the forward pronating angle to twenty degrees from vertical as is shown in angle 34. The angle of twenty degrees from vertical, or seventy degrees from horizontal, is preferred as the maximum orthotropic angle for forward extension of the alveolar ridges and teeth as they emerge. This is in contrast to development of pronate teeth caused by thumbsucking, etc. as is known in the art of pediatric orthodontics. Angles less than twenty degrees are preferable, while an angle between fifteen and twenty degrees is most preferable. Angles beyond twenty degrees would indicate excessive pronate tooth/ridge growth and is prevented by the extending undulations.

FIGS. 28A-28B demonstrate passive and compressed states of nipple. In passive state, as shown in FIG. 28A, skirts 77 and 87 form a more acute angle relative horizontal line 50. Additionally, collar 8 is offset at a lower length of approximately 0-1 mm. As mouth portion 3 is exposed to compression forces, skirts 77 and 87 expand as minor undulations 7 flatten out to allow major undulations 6 to rotate and extend (so as to fill buccal vestibule). Skirt may be outfitted with surface features such as bumps or texture. Skirt 27 includes upper skirt 77, which extends to an angle of approximately twenty degrees from vertical, as defined from superior vertex 75 defining an upper vertical axis 76, and lower skirt 87, which extends to an angle of approximately twenty degrees from vertical, as defined from inferior vertex 85 defining an inferior vertical axis 86.

Figure 26:
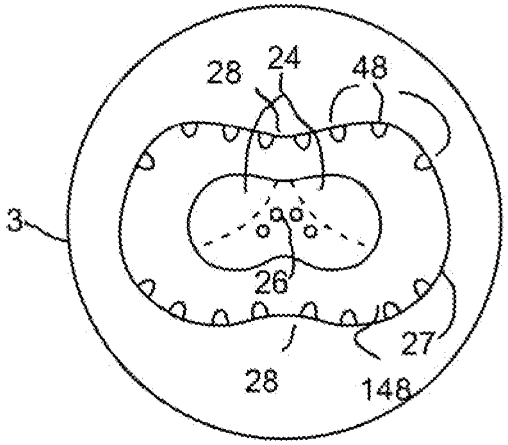
FIG. 26 illustrates a front view of an embodiment in passive state.
Figure 27:
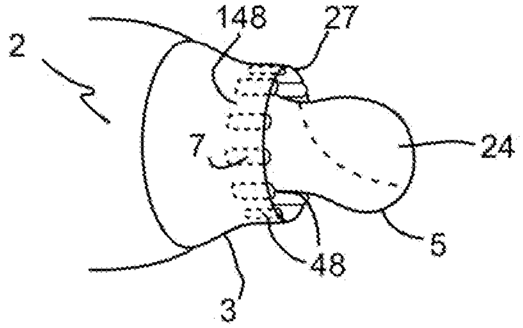
FIG. 27 illustrates a partial transparent side perspective view of an alternative bottle embodiment in passive state as applied into a human mouth.

Referring to FIGS. 26-27, an embodiment with continuous or solid skirt is shown. Skirt 27 frenum relief 28 is shown, the device including both superior and inferior frenum reliefs 28. Solid ribs 48 are joined by skirt web 148. Undulations together each form a vertical or emanating rib. Each rib 48 may include a major bump on the end to form the skirt edge bumper 47, and a minor extension, minor undulation 7, that may contact the alveolar ridge/gum.

Referring to cross-sectional views of line 4-4 in FIG. 3, FIGS. 4 and 6 demonstrate interior of nipple wherein nipple bulb 5 may include obstructive sleep apnea (OSA) pads 24. Pads, referring generally to features on the bottle feed nipple and pacifier nipple, refer to integrated and/or alteration of thickness of one or more regions of the superior side of the nipple and/or nipple shell wherein one or more regions of the nipple walls/shell may include material, or be reinforced with material of at least one different durometer material as compared to another region of the nipple shell/walls. Pads are preferably fixed relative the nipple bulb 5 shell on the superior and/or side surfaces, preferably the superior surface. Pads preferably have a higher durometer, or are stiffer, than the general nipple material. Pads may be integrated on the inside of one or more regions of a shell of the nipple. Pad(s) may be made of the same material as the rest of the nipple, or not. Different materials may be used, or different durometers of the same material, to achieve desired forces. Pads may include different synthetic materials to allow for greater or less elasticity or flex. The pads, or the superior surface of the nipple may include a texture integrated into the upper wall of the nipple. In some embodiments, the materials of the nipple are identical throughout. In other embodiments, the materials may vary where pads are integrated (e.g., in the inside upper portion of the nipple). In further embodiments, the material of the nipple may differ from the material of the shield and/or flanges, in whole or in part. Preferably pads are of a higher (harder) durometer than other portions of the nipple, such as the frenum, posterior end, inferior side, lateral sides, and/or neck. While pads are referred to as OSA pads, the general nature of the pads causing lateral (and potentially secondary upwards) force is to provide treatment or prevention of a number of disorders associated with a raised/narrowed maxillary vault, including OSA, crowded teeth, narrow jaw, muscle disorders, etc.

The pads 24, may include separable right 24A and left 24B pads that are adapted to engage the maxilla of the user mouth, and apply small forces to achieve ideal orthotropic growth of maxilla. Internal padding of OSA pads provide for posterior and lateral forces when engaging maxilla, and provide treatment for maxillary bone development to encourage widening of maxillary sutures or suture lines. By stretching suture lines to increase surface area of maxilla and volume of the arch, the maxilla is extended laterally and anteriorly. Further, the nasal pharyngeal anatomy is expanded to facilitate breathing. This widening and growth of the orthognathic structures reduces risks and effects of SID and obstructive sleep apnea.

Set between right and left OSA pads 24A and 24B is center cleft 45 that may bisect OSA pads along longitudinal plane 124. OSA pads may include a cleft 45 along plane 124 that may connect OSA pads either along nipple bulb 5 shell 106, or include a rigid material joining both OSA pads.

OSA pads 24 may include two separate pads, as shown, and milk pore 26 may include one or more holes, or separate openings (as shown in FIG. 26), to allow for fluid passage from bottle through nipple. OSA pads 24 are preferably thicker pads that allow lateral expansion to aid in orthotropic development of the maxilla and nasal floor. OSA pads 24 press and separate to force expansion of the maxilla. Employing lateral outward pressure on the maxilla, encourages broadening the maxilla, thus causing opening the floor of the nose. This well-developed maxilla and nasal floor provide proper aeration through the nostrils, and increases ventilation through the nose to decrease harmful issues associated with asthma and allergies. Nose breathing helps warm incoming air, filter the air, and mixes nitric oxide (a potent vasodilator) to be received by the alveoli in the lungs. This in turn causes better oxygen absorption and raises oxygen saturation in the blood. Further, with proper stretching/growth of the appropriately widened maxilla through orthotropics, the mandible will be induced to expand to a proper width as well in accordance with widening of upper teeth/ridge in maxilla. Compressive forces applied (by the mouth) force down on roof of nipple as the infant feed. Compressive forces are also applied to the interior side by the infant's tongue, and fluid is forced from pore. Superior and lateral forces on nipple/mouth portion are applied to create maxillary orthotropic forces in resistance via OSA pads, and guide better maxillary bone development. The proper nasal pharyngeal anatomy reduces the risk of sleep issues and OSA. (Note: passive state shape is shown in broken lines to mark dynamic change in mouth portion shape.) Additionally, if the OSA pads are used to exert a widening/sideways lateral outwardly force that widens the maxilla, one may prevent or treat issues wherein the vault is widened and thereby lowered reducing lift on the vomer and anterior nasal spine, thus preventing rising forces against the ethmoid bone. The lateral maxillary bones are flattened and spread, preventing upwards force on the growth of the vomer. By widening the two maxillary plates, potential growth of the vomer will reach its vertical peak without colliding with the ethmoid bone, thereby decreasing the chance of developmental deviated septum.

In all embodiments, the OSA pads may be a hard or soft solid, gel or otherwise material as known in the art for oral treatments, such as silicone, rubber, plastic, calcium, silver, zinc, or otherwise. Further, the OSA pads may be self-contained fluid sacs filled with a water, or more viscous fluid to soften the impact on the maxilla, upper palate. The OSA pads may be filled with a fluid that contains non-dissolved particles that provide for minor vibrations as the OSA pad sac is manipulated (or changes shape). Further the OSA pads may be in fluid communication with a fluid filled bladder, such that compression of the bladder forces fluid into the OSA pad sacs.

As can be seen in FIGS. 3 and 5, mouth portion 3 is shown. Air vent 29 is preferably placed on superior side 129 on the anterior edge 103 of mouth portion 3, near where mouth portion meets cap (not shown here). Minor undulations 7 provide for a zone of undulation that can stretch or otherwise add to turbulence of flowing fluid. Nipple bulb 5 extends posteriorly from orthotropic collar 8, and further include tongue guide 21. Collar 8 includes an offset, whereby skirt superior rib is set forward (or anterior), approximately 1-3 mm relative skirt inferior rib. The offset of the collar and ribs is associated with proper orthognathic alignment of the jaw.

As can be seen in FIG. 5, a fluid flow design is shown. Multiple force vectors induce distortion and migration of major undulations 6 to create flaps that fill the maxillary and mandibular buccal vestibules. Air vent 29 is set outside of user lip to allow a one-way valve flow of air into the bottle so as to prevent vacuum within the bottle. Air vent is positioned in a manner that shall be preferably on the superior side of nipple, but may be on the inferior side. Both push and pull force vectors impact the mouth portion and nipple. Push forces are provided by the compressive motions, such as lips pursing and alveolar ridges/teeth biting against the upper and lower portions of the device. Further, the tongue pressing upwards causes a push force vector against the nipple, further distorting the shape. Pull vectors are provided by the sucking and vacuum forces that draw fluid from the bottle through the pores and air into the vent. Further, pull vectors cause the nipple to stretch, with the bulb elongating in a posterior direction, causing the skirt to open to a more upright and vertical orientation, and top of bulb may meet the roof of the mouth vault.

It is preferable that the air vent 29 prevents fluid exiting air vent. As the force vectors engage the nipple, the lips purse around neck 4, and alveolar ridges rest along collar 8 and may squeeze. Maxillary and mandibular alveolar ridges engage collar 8 to further squeeze nipple and secure relative position of nipple in oral cavity. Finally, sucking force induces a pull or vector force towards the throat. Sucking is supported by tongue thrust from tongue 19, preferably at tongue guide 21 on the inferior side of nipple. OSA pads 24 are forced up against the maxilla. Fluid flows out of bottle and through milk pores 26. The path of flow is guided via the shape of the nipple as it is deformed. Undulations 6 and 7 extend into vestibules causing a broadening of the nipple. Fluid flows from bottle into undulations of skirt 27 and causes turbulence within undulations. This turbulence is preferred to prevent solids from forming, and otherwise as a hygienic cleaning function to prevent buildup of residue, or otherwise stagnant fluid. As the undulations are flushed, fluid continues to flow into nipple, in turbulent fashion until reaching release at milk pore 26. Both the repetitive swallow action and rhythmic vibrational signaling induce stem cell activity.

As shown in FIGS. 15-19, major undulations 6 form a skirt 27 and bumper 47. Nipple bulb 5 includes tongue depression guide. The mouth portion includes air vent 29 and channel 105. Channel is set to allow screw cap 2 (not shown) to fit via fastening method over mouth portion. Preferably, cap includes an extending interior flange to fit into channel, while mouth portion is made of a flexible material that can squeeze into cap. As can be seen in FIG. 6, OSA pads 24A and 24B are set with a superior cleft 45 set therebetween. OSA pads are preferably of a thicker material, and cleft allows for relative movement of OSA pads to deform flex and bend as the nipple is deformed under pressure. Tongue depression guide 21 is shown along with a single milk pore 26. The clefting of the internal OSA pads will, upon tongue compression, cause lateral and superior loading of the two maxillary membranous bony plates.

Figure 7:
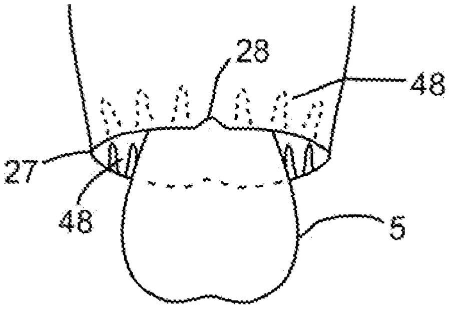
FIG. 7 illustrates a top view of a mouth portion in passive state of an embodiment of the present invention.
Figure 10:
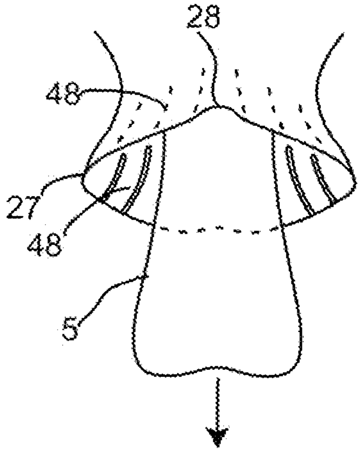
FIG. 10 illustrates a top view of a mouth portion in compressed state of an embodiment of the present invention.
Figure 8:
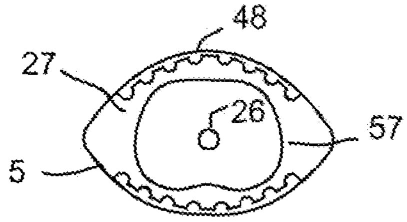
FIG. 8 illustrates a frontal view of a nipple and skirt in passive state of an embodiment of the present invention.
Figure 11:
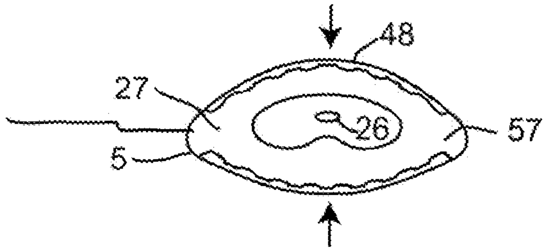
FIG. 11 illustrates a frontal view of a nipple and skirt in compressed state of an embodiment of the present invention.
Figure 9:
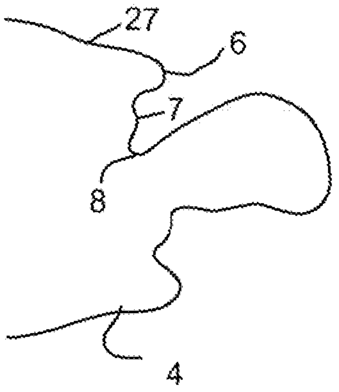
FIG. 9 illustrates a cross-sectional side view of a skirt and collar in passive state an embodiment of the present invention.
Figure 12:
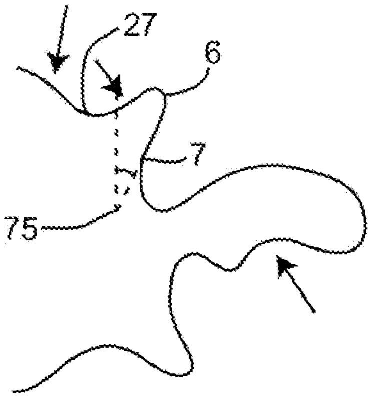
FIG. 12 illustrates a cross-sectional side view of a skirt and collar in compressed state an embodiment of the present invention.

Various shapes of the mouth portion 3 are shown in FIGS. 7-12. FIGS. 7-9 show the mouth portion in passive state (when equilibrium forces are set upon system). Skirt 27 includes frenum relief 28 to engage with the user's mouth. Skirt 27 is shown closed, and nipple bulb 5 is intruded. Major undulations 6 form skirt 27 and edge 47. Major undulations 6 and minor undulations 7 forms ribs 48. Skirt may form a flat angle at rest. FIGS. 10-12 show the system in compressed form. Nipple bulb 5 is extended (posteriorly) forced by compressive forces and/or sucking vacuum (pull) forces. Skirt 27 flares out as neck 4 is squeezed by lips to provide lateral opening of skirt. Nipple bulb 5 stretches and extrudes. Ribs 48 are also stretched and reach a low angle profile. When ribs and skirt flare out, skirt fills buccal vestibule. Skirt increases in height, narrows (as minor undulations flatten), and turns upright. Skirt 27 also provides a bumper of sort to help guide orthotropic angle of alveolar ridge—preventing excessive pronation. Skirt may form a high angle, approximately twenty degrees, preferably to manage pronation of teeth, as discussed herein.

Mouth portion 3 is shown in isolation for further detail of an embodiment of the present invention in FIGS. 15-24. Mouth portion 3 includes circumferential features on anterior side 103, including edge flange 101 and secondary flange 102 forming channel 105. Channel 105 mates with interior flange in cap (not shown) to provide a flexible, yet water-tight seal when mouth portion applied to cap. Skirt 27 forms with major undulations 6. In this embodiment with discontinuous skirt 27, it is preferred that an even number of major undulations 6, and ribs 48, are formed with a center gap 46 set therebetween on both superior and inferior sides. Center gap 46 acts as frenum relief. Center gap may serve as frenum relief. Nipple bulb 5 includes pore 26, or pores in alternative embodiments. Skirt 27 defines side edges 57, absent of undulations. Nipple bulb 5 includes tongue depression guide 21 on the underside of nipple as a sort of lingual hemi-torus. Tongue depression guide 21 forms an inverse saddle point 121 (mathematical) whereby a local maximum is formed in the underside surface of nipple towards center of tongue guide 21. Tongue guide anterior lingual ridge gently forces the mandible forwards as the sucking motion occurs.

Mouth portion 3 may include interior separator 90, that can function to provide fluid impermeable material to prevent flow of fluids back into bottle. Separator 90 is preferably planar and extended along interior surface of mouth portion. One or more one-way fluid valves 91 may be employed to function both as a one-way valve to prevent flow of fluids back into bottle as nipple is depressed, and further serve to increase hydraulic pressure within the mouth portion nipple bulb 5 and skirt to enhance deformation, and further increase force applied by the pad(s) on the arch and skirt against alveolar ridge(s). The closed valve also may cause movement of fluids within mouth portion structures to follow paths around perimeter of mouth portion to cause specific flow paths that may in turn yield vibrations that can enhance growth factors. One-way fluid valve increases fluid pressure in the nipple chamber after the first suction event occurs to retain fluid in the nipple and thereby maintain pressure via OSA pads against maxilla.

Figure 21:
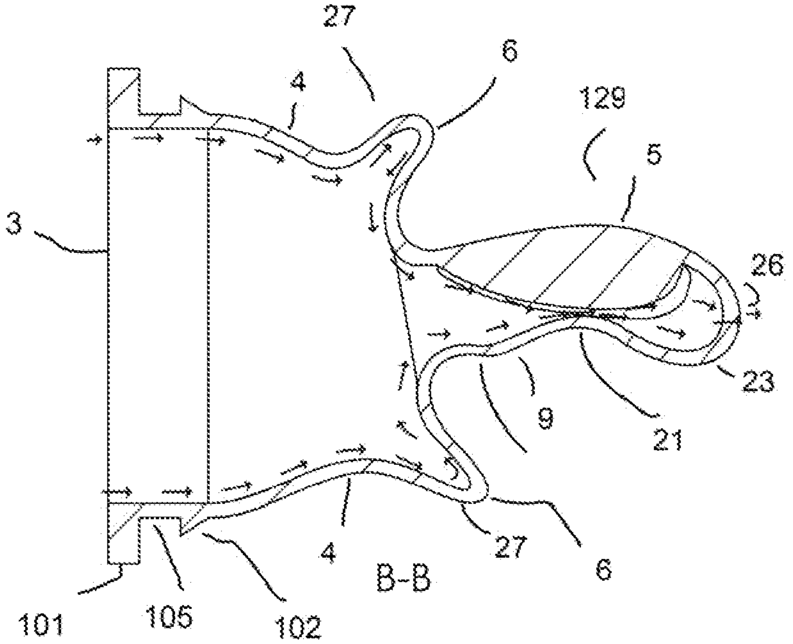
FIG. 21 illustrates a side cross-section view along lines BB of FIG. 16 as when the mouth portion is in a compressed state.
Figure 22:
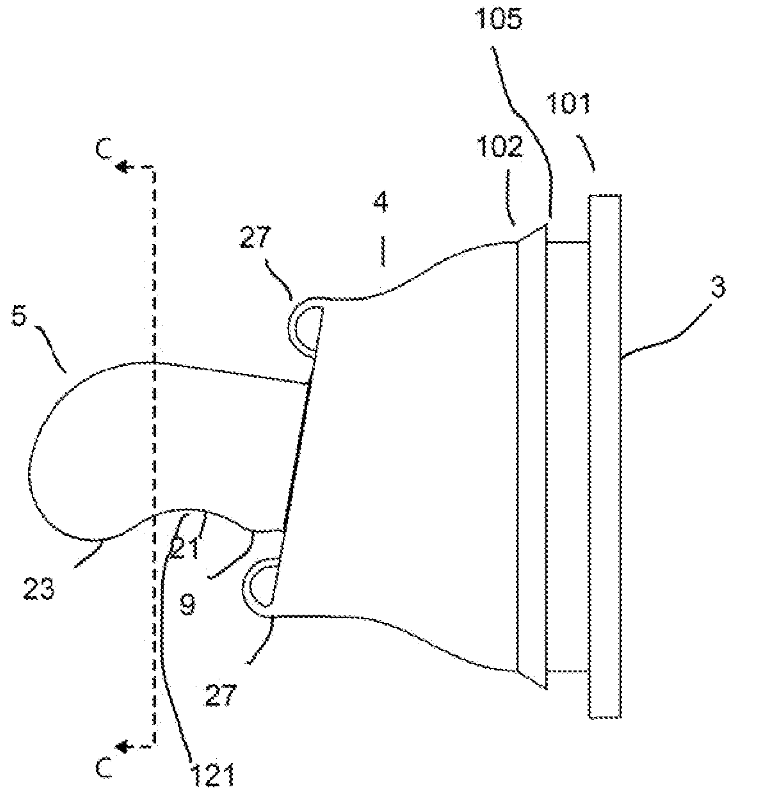
FIG. 22 illustrates a side view of a mouth portion of an embodiment of the present invention.
Figure 23:
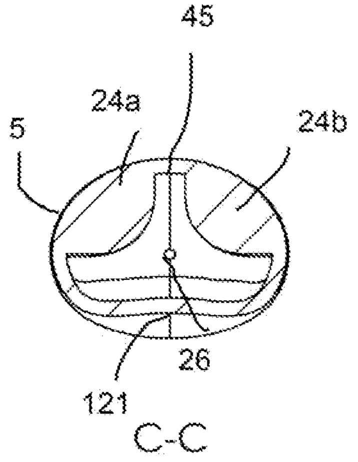
FIG. 23 illustrates a front cross-sectional view along lines C-C of FIG. 22 in passive state.
Figure 24:
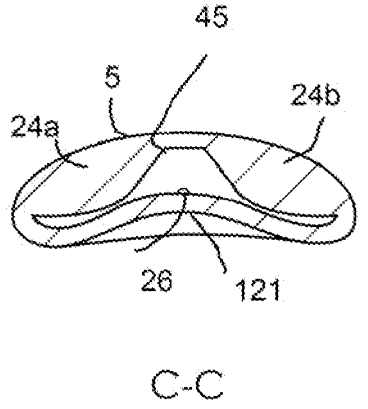
FIG. 24 illustrates a front cross-sectional view along lines C-C of FIG. 22 in compressed state.

One-way fluid valves 91 are preferably set along interior edge 92 of mouth portion 3 at perimeter. Further, pads 24 are set preferably within (as shown, or part of the features of the nipple shell, or less preferably on the exterior surface of nipple shell (not shown)). FIG. 21 shows feed fluid paths. As shown in FIG. 23-24, nipple bulb 5 moves from passive state (FIG. 23) to compressed state (FIG. 24). Tongue guide 21 is forced upwards and further distorts nipple to cause pads **24*a* and 24*b* apart. (Superior) cleft 45 allows for mechanical separation and rotation of pads. As shown in FIG. 21, fluid flow path is indicated by arrows, fluid entering mouth portion 3, passing through skirt (causing interior flushing/cleaning and causing vibrations) around pad 24 and out pore 26**.

FIG. 25 further demonstrated the multiple force vectors caused when in use by user's mouth to distort and reshape mouth portion 3 on cap 2. Force vectors induce distortion and migration of skirt (or flaps) and also produce turbulence of flow through mouth portion 3. Pursing of lips 10 and 11 around neck 4 cause compressive force. Alveolar ridges 12 and 13 bite down on collar 8. Tongue 19 provide thrust up against tongue guide 21 and compresses against maxilla vault 20.

The present invention is also directed to an orthognathically corrected feed nipple that serves multiple purposes. The device is orthognathically positioned to help nurture the jaws grow into a better alignment. Under standard operating protocols, the invention provides a method for feeding and maintaining oral hygiene. As suckling is conducted, the nipple may be compressed by external forces applied by the patient's oral muscles. The suckling motion causes the nipple to compress and extend posteriorly into the back of oral cavity and/or throat. As the feeding suckling takes place, the skirt rotates outwardly (and anteriorly) to engage the alveolar ridges and/or vestibules. As the skirt rotates, the minor undulations may contact, and move against (or brush), surfaces of the oral cavity.

As is shown in FIGS. 29-32, posterior end 205 may be bifurcated as lobes 205A and 205B separated, with interlobe webbing 206 therebetween. Mouth portion 3 includes neck 4 skirt 27 bulb 5 with tongue guide 21 pads 24 and pore 6. Crevasse 271 forms where lobes mate, and crevasse 271 is preferably set posterior of tongue guide 21 and of posterior inferior lingual ridge 9. Lobes 205A and 205B split in center 207. Lobes may be made of a high durometer material to maintain the shape of the entire lobe, or more preferably the upper surface of lobes retains shape as the nipple 355 is lateral expanded. Lobes maintain shape as pressed up against maxilla to cause outward/lateral and upward forces on maxilla.

Figure 30:
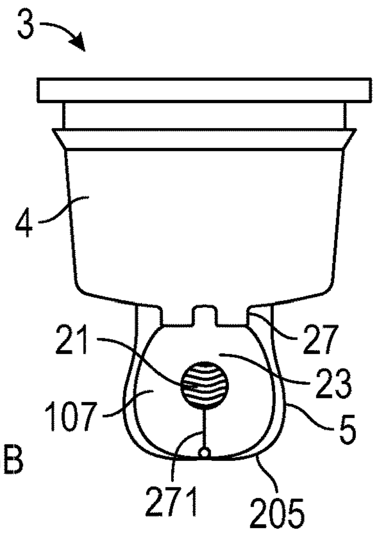
FIG. 30 illustrates an underside of an alternative embodiment of the present invention.
Figure 31:
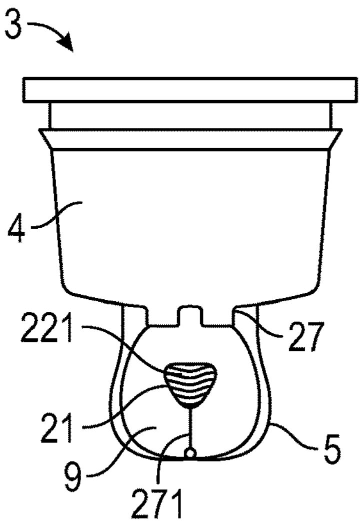
FIG. 31 illustrates an underside of an alternative embodiment of the present invention.
Figure 32:
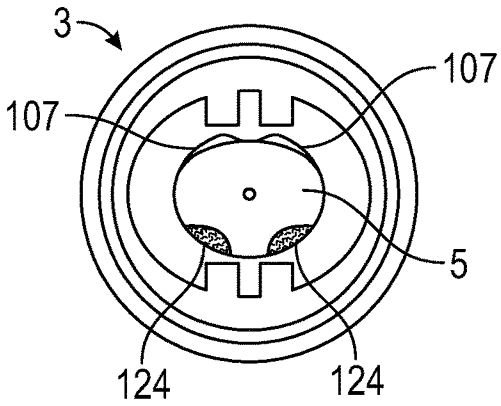
FIG. 32 illustrates a frontal view of a posterior end of an embodiment of the present invention.
Figure 33:
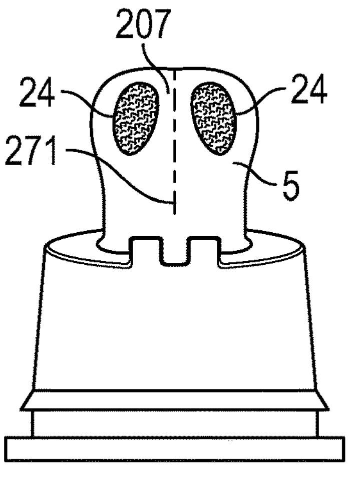
FIG. 33 illustrates a top side view of the embodiment of FIG. 31.

Bulb with or without bifurcated lobes or solid shape (as described above), various shapes and contours of tongue guide may be incorporated. Tongue guide 21 includes posterior inferior lingual ridge 22 and anterior inferior lingual ridge 23 and lateral ridges 107. Tongue guide 21 may form a hemi-torus shape with lateral inferior lingual ridges 109 on either side of tongue guide 21 as shown in FIG. 30. Tongue guide 21 may include an inverted saddle point 221 as a local high point in guide 21. Depending on user preference or orthognathic requirements, the tongue guide may form various shapes. As shown in FIGS. 29 and 31, the tongue guide may include a flattened ridge, deviating from a concentric toroidal portion. The tongue guide may form a rounded triangular shape. As shown in FIG. 29, posterior ridge may be flattened to broaden the posterior ridge and enhance mandibular anterior forces, such as to correct an overbite when sucking. Alternatively, as shown in FIG. 31, the posterior ridge may be narrowed and the anterior ridge flattened. This may be useful to correct an underbite.

Thrust by user's tongue may be pressed up into guide 21 and outward to all inferior ridges 22, 23, and 109, further forcing lobes 205 apart. One advantage of this, and other embodiments, is that as the oral device is compressed, the nipple is extended posteriorly into the oral cavity (towards throat) so that pads can engage deeper (more posterior) against maxillary palate, allowing lateral pressures to press against anterior and posterior maxillary palate.

In some embodiments, pads may be set upon outer surface of shell as provide external bumps. Preferably, the pads are set within the bulb or replace portions of the nipple shell. As the nipple is compressed, pads migrate with shell of nipple, as nipple is compressed and flattened, to orient against left and right maxillary plates of the mouth upper palate. While pads are initially set next to, or near one another along superior, as the nipple is compressed, upward forces on bottom of nipple along with other forces, cause the compressed nipple to extend laterally, moving pads laterally apart from one another. In this embodiment, pads may not be bound by central cleft, and instead may be separable features.

I claim:

1. A bottle-feed nipple device, comprising:

a cap, comprising a cap face; and a mouth portion extending from the cap, wherein a direction from the cap face to the mouth portion represents a first direction, the mouth portion comprising:

a neck extending in the first direction from the cap face into a skirt comprising a superior skirt and an inferior skirt;

the superior skirt extending from the cap face in the first direction at a first side of the bottle-feed nipple device, the superior skirt comprising a bumper edge along a first end of the superior skirt, wherein the first end of the superior skirt is opposite the cap face in the first direction;

the inferior skirt extending from the cap face in the first direction at a second side of the bottle-feed nipple device, wherein the second side is opposite the first side;

a nipple bulb extending in the first direction between the superior skirt and the inferior skirt, the nipple bulb comprising a right pad, a left pad, a pore, a superior cleft between the right pad and the left pad, and a tongue guide formed along an outer surface of an inferior side; and a collar connecting the nipple bulb to the superior skirt and the inferior skirt, wherein the mouth portion forms a resting shape when at rest, wherein when the mouth portion is in the resting shape, the superior skirt forms a first angle with respect to the first direction and the inferior skirt forms a second angle with respect to the first direction, wherein when a compression is applied to the nipple, the collar or the neck, the mouth portion has a compressed form, wherein when then mouth portion is in the compressed form the superior skirt forms a third angle with respect to the first direction and the inferior skirt forms a fourth angle with respect to the first direction, wherein the third angle is greater than the first angle, and wherein the fourth angle is greater than the second angle.

2. The bottle-feed nipple device as set forth in claim 1, wherein the right pad and the left pad are separated by a first distance in the compressed form, and wherein the right pad and the left pad are separated by a second distance in the resting shape, wherein the first distance is greater than the second distance.

3. The bottle-feed nipple device as set forth in claim 1 further comprising a bifurcated dual lobe nipple system, wherein the bifurcated dual lobe nipple system comprises a first lobe supporting the right pad and a second lobe supporting the left pad.

4. The bottle-feed nipple device as set forth in claim 3, wherein the bifurcated dual lobe nipple system further comprises an interlobe webbing set between the first lobe and the second lobe.

5. The bottle-feed nipple device as set forth in claim 4, wherein the first lobe and the second lobe comprise a material configured to maintain a shape of the first and second lobes.

6. The bottle-feed nipple device as set forth in claim 4, wherein a crevasse forms where the first lobe and the second lobe meet.

7. The bottle-feed nipple device as set forth in claim 1, wherein the inferior skirt comprises an indentation along an edge of the inferior skirt.

8. The bottle-feed nipple device as set forth in claim 7, wherein the indentation along the edge of the inferior skirt is an inferior central frenum relief set at a midpoint of the inferior skirt.

9. The bottle-feed nipple device as set forth in claim 1, wherein the collar comprises a superior collar and an inferior collar anterior of the nipple bulb, the superior collar set anterior of the inferior collar.

10. The bottle-feed nipple device as set forth in claim 9, wherein the superior collar is set 1-3 mm anterior the inferior collar.

11. The bottle-feed nipple device as set forth in claim 10, wherein the superior skirt comprises at least two separable ribs emanating from the superior collar to an edge of the skirt.

12. The bottle-feed nipple device as set forth in claim 11, wherein each of the at least two separable ribs comprise a minor undulation between the superior collar and the edge, and a major undulation forming the bumper edge.

13. The bottle-feed nipple device as set forth in claim 11, wherein the at least two separable ribs are joined by a skirt web.

14. The bottle-feed nipple device as set forth in claim 1, further comprising a one-way valve within the nipple bulb preventing fluid flow towards the cap.

15. The bottle-feed nipple device as set forth in claim 1, wherein the superior skirt comprises an indentation along an edge of the superior skirt.

16. The bottle-feed nipple device as set forth in claim 15, wherein the indentation along the edge of the inferior skirt is a superior central frenum relief set at a midpoint of the superior skirt.

17. The bottle-feed nipple device as set forth in claim 1, wherein the tongue guide comprises an inverted saddle point.

18. The bottle-feed nipple device as set forth in claim 1, wherein the mouth portion comprises an air vent at the neck proximate to the cap.

19. The bottle-feed nipple device as set forth in claim 18, wherein the air vent is at the first side of the bottle-feed nipple device.

20. The bottle-feed nipple device as set forth in claim 18, wherein the air vent is at the second side of the bottle-feed nipple device.

21. The bottle-feed nipple device as set forth in claim 1, wherein the pore comprises one or more apertures in the nipple bulb.

* * * * *